C. F. E. BLAICH & P. A. BISHOP.
RUDDER WHEEL.
No. 23,284. Patented Mar. 15, 1859.
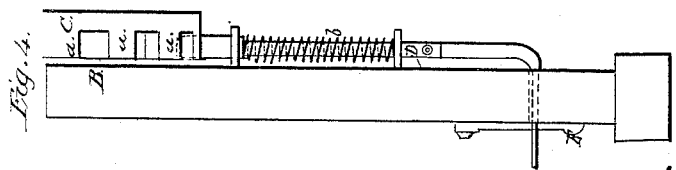
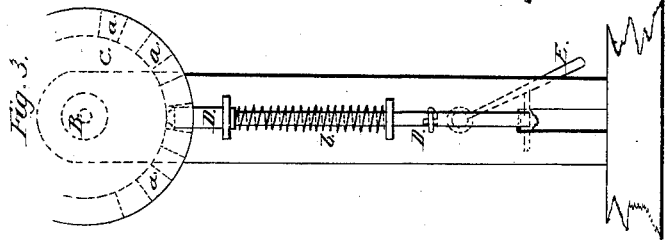
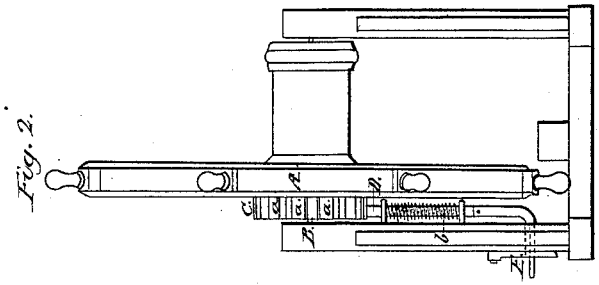
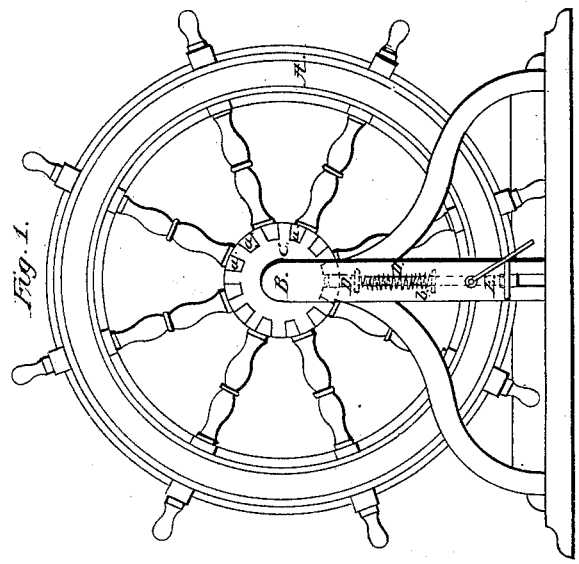

UNITED STATES PATENT OFFICE.

C. F. E. BLAICH AND PETER A. BISHOP, OF ELYRIA, OHIO, ASSIGNORS TO PETER A. BISHOP, AFORESAID.

STEERING-WHEEL.

Specification of Letters Patent No. 23,284, dated March 15, 1859.

*To all whom it may concern:*

Be it known that we, C. F. E. BLAICH and PETER A. BISHOP, of Elyria, in the county of Lorain and State of Ohio, have invented certain new and useful Improvements in the Method of Staying Rudder-Wheels; and we do hereby declare that the following is a full, clear, and exact description of the same, reference being had to the accompanying drawings and the letters of reference marked thereon, in which—

Figure 1 is a side elevation. Fig. 2 is an end elevation. Figs. 3 and 4 are detached views.

Like letters refer to like parts in the different figures.

The nature of our invention consists in the method of constructing clutches or stops for the purpose of staying rudder wheels in any desired position and relieving it at pleasure.

A represents an ordinary rudder wheel used in practice. B represents its bearings which are supported by posts suitably braced in the ordinary manner.

C represents a disk having cog-like projections "*a*" formed on its face. See Fig. 1. Said disk is secured firmly to the axle of wheel A.

D represents a sliding dog which being secured in suitable brackets is forced between the projections "*a*" by means of a spiral spring "*b*" and thus securing the said wheel firmly in its position. Said sliding dog is provided at the lower end with a foot-piece which projects forward through the post by which the wheel is supported.

E represents a drop dog which is used for the purpose of securing the sliding dog in position while withdrawn from the disk. When necessary the drop dog E is removed from the foot piece of the slide and thus enables the spiral spring "*b*" to force the dog D in contact with the disk C and thus effectually clutch or stop the wheel.

What we claim as our invention and desire to secure by Letters Patent is—

The vertically sliding dog, being secured in suitable brackets and provided with a foot piece, pawl, and joint, as described, in combination with the spiral spring and ratchet, the whole being described and operated as set forth.

CHRISTIAN F. E. BLAICH. [L. S.]
  PETER A. BISHOP. [L. S.]

Signed and sealed in our presence:
 H. B. WEST,
 H. F. WILLSON.